United States Patent [15] 3,683,005
Sota et al. [45] Aug. 8, 1972

[54] CYCLOPROPANECARBOXYLIC ACID ESTERS

[72] Inventors: Kaoru Sota, Tokyo; Akifumi Hayashi, Saitama; Takehiro Amano, Kanagawa, all of Japan

[73] Assignee: Taisho Pharmaceutical Co., Ltd., Tokyo, Japan

[22] Filed: Jan. 8, 1970

[21] Appl. No.: 1,541

[30] Foreign Application Priority Data

| Jan. 9, 1969 | Japan | 44/1827 |
| Jan. 20, 1969 | Japan | 44/3929 |
| April 18, 1969 | Japan | 44/30362 |
| May 31, 1969 | Japan | 44/42779 |
| May 31, 1969 | Japan | 44/42780 |
| June 7, 1969 | Japan | 44/44847 |
| June 23, 1969 | Japan | 44/49445 |
| July 19, 1969 | Japan | 44/57199 |
| Sept. 6, 1969 | Japan | 44/70809 |
| Sept. 19, 1969 | Japan | 44/74503 |
| Sept. 30, 1969 | Japan | 44/77872 |
| Oct. 1, 1969 | Japan | 44/78450 |
| Oct. 22, 1969 | Japan | 44/83897 |
| Nov. 6, 1969 | Japan | 44/88908 |
| Nov. 11, 1969 | Japan | 44/90238 |

[52] U.S. Cl.........260/468 P, 260/611 A, 260/612 D, 260/613 D, 260/618 R, 260/651 R, 424/305, 424/306
[51] Int. Cl............................................C07c 69/74
[58] Field of Search.....................................260/468

[56] References Cited

UNITED STATES PATENTS 3,285,950   11/1966   Weber......................260/468

OTHER PUBLICATIONS

Govek et al., J. Econ. Ent. 60, 1587 (1967)

*Primary Examiner*—Lorraine A. Weinberger
*Assistant Examiner*—Robert Gerstl
*Attorney*—Wenderoth, Lind & Ponack

[57] ABSTRACT

This invention relates to novel cyclopropanecarboxylic acid esters, to a process for preparing the same and to insecticidal composition containing the same.

13 Claims, No Drawings

CYCLOPROPANECARBOXYLIC ACID ESTERS

More particularly, it relates to novel cyclopropanecarboxylic acid esters represented by the general formula I,

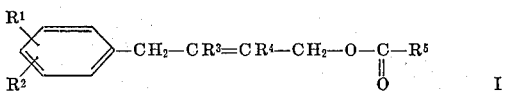   I wherein $R^1$ and $R^2$ are independently hydrogen or a halogen atom or a lower alkyl such as methyl and ethyl, methoxy or nitro group; $R^3$ and $R^4$ are separately hydrogen or a halogen atom or methyl or methoxy group, or both $R^3$ and $R^4$ represent together the third valence bond between two carbon atoms to which they are attached; and $R^5$ is one selected from the following radicals:

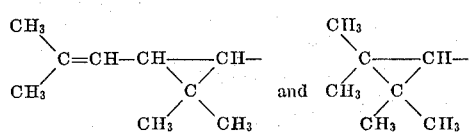

to a process for preparing the same and to the use thereof as an insecticidal agent.

Since World War II, various kinds of synthetic insecticides have been introduced for pest control instead of naturally occurring ones. A great amount of DDT and other chlorinated insecticides have been applied to an attack on disease-carrying or crop-destroying insects in all the world, because of their low mammalian toxicity and the low cost for the production thereof. Recently, however, it has been reported not only that many instances of insects become resistant to these insecticides, but that intolerable amounts of their residues accumulate in the lipid of warm blooded animals and others. The use of the chlorinated insecticides have been prohibited in some countries. Thus, at present, an insecticide to be replaced for them is urgently desired. Pyrethrins and their synthetic relatives such as allethrin and the like are superior in the low mammalian toxicity to other synthetic insecticides such as phosphate and carbamate series compounds, but the use of the cyclopropanecarboxylic acid esters must be subject to restriction in household and agricultural applications due to their high cost price and instability against atmospheric agencies.

Hereupon, an object of the present invention is to provide novel cyclopropanecarboxylic acid esters which possess significant insecticidal activity, rapid paralytic effect, low mammalian toxicity and good weather resistance, which can be prepared from the readily available materials by a simple process with low cost price and which can be replaced for the aforementioned chlorinated compounds.

The compounds of the present invention as defined in the formula I, have excellent biological properties. For instance, the effect of 3-chloro-4-phenyl-2-butenyl 2,2-dimethyl-3-isobutenylcyclopropanecarboxylate, one of the present compounds, on house flies is five to 10 times greater than those of pyrethrins, allethrin and tetrahydrophthalimidemethyl chrysanthemate. While, even when 20 grams of the above ester of the present invention per 1 kilogram of the body weight are given to mice, no death is observed. Namely, the acute toxicity of the ester to mice is found to be less than one-twentieth that of allethrin.

Furthermore, the esters of the present invention are extremely simple and they do not contain any troublesome group such as cyclopentenone, 1,2-dicarboximide and furan rings as seen in known pyrethroids. According to the present compounds, therefore, the instability and complicated producing process can be avoided.

The compounds of the present invention as defined in the formula I, can be prepared according to the conventional esterifying procedures well known to the skilled in the art. 2,2-dimethyl-3-isobutenylcyclopropanecarboxylic acid or 2,2,3,3-tetramethylcyclopropanecarboxylic acid or a functional derivative thereof such as the halide, anhydride or ester may be reacted with a suitable arylalkene or arylalkyne derivative. The arylalkene and arylalkyne derivatives employed in the preparation of the present compounds are so stable that any optional method can be used for this process.

The arylalkyne derivatives preferably used in preparing the compounds of formula I wherein $R^3$ and $R^4$ represent together the third valence bond between two carbon atoms to which they are attached, are the arylalkynol (II) and arylalkynyl halide (III) represented by the following formulas:

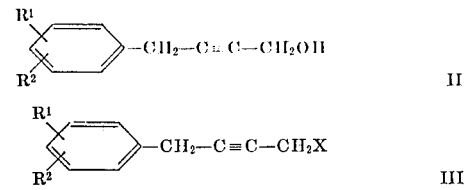

wherein X is chlorine or bromine atom and $R^1$ and $R^2$ are same as defined above.

The arylalkynol (II) can be prepared by reacting the corresponding aryl magnesium halide with 4-halo-2-butyn-1-ol under conventional Grignard conditions. The arylalkynyl halide (III) can be prepared by treating the corresponding compound of formula II with a halogenating agent such as thionyl chloride or phosphorous tribromide.

The arylalkene derivatives preferably used in preparing the arylalkenyl esters of the present invention are the arylalkenols (IV and V) and arylalkenyl halides (VI and VII) represented by the following formulae:

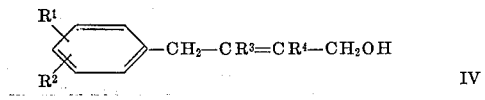   IV

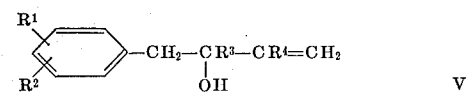   V

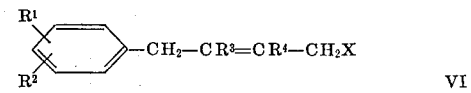   VI

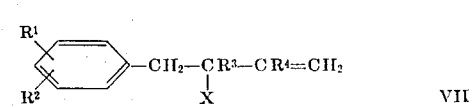   VII wherein X is chlorine or bromine atom and $R^1$, $R^2$, $R^3$ and $R^4$ are same as defined above. The compounds V and VII are the allylic isomers of the compounds IV and VI, respectively, and the compounds V and VII afford the same end product that obtained from the corresponding compounds IV and VI, respectively.

The compound V may be prepared by a Reformatsky reaction from an aryl zinc halide and a carbonyl compound such as acrolein, methacrolein and methyl vinyl ketone. The compound VI and VII may be prepared by a Meerwein arylation reaction from an aryl diazonium halide and a diene such as 1,3-butadiene, 2-methyl-1,3-butadiene (isoprene), 2,3-dimethyl-1,3-butadiene, 2-chloro-1,3-butadiene (chloroprene), 2,3-dichloro-1,3-butadiene, 2-bromo-1,3-butadiene and 2-methoxy-1,3-butadiene. For example, the reaction of phenyl diazonium chloride with 1,3-butadiene in aqueous acetone yields 1-chloro-4-phenyl-2-butene and 3-chloro-4-phenyl-1-butene; with chloroprene yielding 1,2-dichloro-4-phenyl-2-butene and 1,3-dichloro-4-phenyl-2-butene.

The compound IV may be easily derived from the compound V, VI or VII.

The arylalkene derivatives of the formula IV–VII wherein $R^3$ and $R^4$ are both hydrogen atoms can be alternatively prepared by partial hydrogenation of the corresponding arylalkyne derivatives.

For the esterification process, the arylalkenol (IV) or the arylalkynol (II) may be condensed through dehydration with the cyclopropanecarboxylic acid. The alkenol (IV or V) or the alkynol (II) may be reacted with the acid anhydride. The alkenol (IV) or the alkynol (II) may be condensed with the cyclopropanecarboxylic acid halide such as the chloride and bromide, in the presence of a basic condensing agent such as an organic base, e.g. pyridine, triethylamine and the like or such an inorganic base, e.g. and alkali metal carbonate or hydroxide. The arylalkenol (IV) or the arylalkynol (II) may be heated with a lower alkyl ester of the cyclopropanecarboxylic acid in the presence of a basic catalyst such as sodium and potassium and an alcoholate thereof. The arylalkenyl halide (VI or VII) or the arylalkynyl halide (III) may be condensed with the cyclopropanecarboxylic acid or a salt thereof in or without presence of a basic condensing agent.

The novel esters of the present invention can be used for prevention of epidemics similarly to pyrethrins and their synthetic relatives. However, the higher insecticidal activity, the lower mammalian toxicity and the better weather resistance of the present esters promise the more extensive applications, in combination with their economical advantage, to household and industry.

The compounds of this invention may be formulated with carriers, diluents, synergists, other insecticidal ingredients and/or agricultural chemicals by a method well known for the preparation of insecticidal compositions, and they may be prepared, for example, in the form of dusts, granules, mosquito coils, wettable powders, solutions, emulsions and aerosols. The concentration of the compound of the present invention in the insecticidal composition can widely vary, due to objective insects, kinds of application method and desired effect, in the range of 0.05–10 percent by weight which is customary with known pyrethroids, or in view of the greater effectiveness of the present compounds, they may be used in much lower concentration.

The following examples are illustrative of the present invention with further details and do not mean any limitation. In these examples, "g" signifies grams, and "ml" signifies milliliters.

EXAMPLE 1

A solution of 3.0 g of 4-phenyl-2-buten-1-ol, 2.8 g of 2,2,3,3-tetramethylcyclopropanecarboxylic acid and 0.2 g of p-toluenesulfonic acid in 50 ml of toluene is refluxed to remove the water formed azeotropically. When the theoretical amount of water is separated (about 16 hours are required.), the reaction mixture is cooled, washed successively with aqueous sodium carbonate and water, and dried over anhydrous magnesium sulfate. The solvent is then evaporated and the resulting residue is distilled under reduced pressure to afford 4.4 g (81 percent) of 4-phenyl-2-buten-1-yl 2,2,3,3-tetramethylcyclopropanecarboxylate, b.p. 117°–118°C/0.13 mmHg, $n_D^{20}=1.5150$. Analysis—Calcd. for $C_{18}H_{24}O_2$: C 79.23 percent, H 8.88 percent, Found: C 79.28 percent, H 8.74 percent.

EXAMPLE 2

To a solution of 2.9 g of 4-phenyl-2-butyn-1-ol and 2 ml of pyridine in 30 ml of benzene, 3.7 g of 2,2-dimethyl-3-isobutenylcyclopropanecarboxylic acid chloride in 10 ml of benzene is added dropwise at 0°C. After standing overnight at room temperature, the mixture is washed successively with dilute hydrochloric acid, water, aqueous sodium carbonate and water, and then dried over anhydrous magnesium sulfate. The solvent is evaporated and the resulting residue is distilled under reduced pressure to give 5.1 g (86 percent) of 4-phenyl-2-butyn-1-yl 2,2-dimethyl-3-isobutenylcyclopropanecarboxylate, b.p. 141°–142°C/0.15 mmHg, $n_D^{20}=1.52308$. Analysis—Calcd. for $C_{20}H_{24}O_2$: C 81.04 percent, H 8.16 percent, Found: C 80.77 percent, H 8.12 percent.

EXAMPLE 3

A mixture of 4.0 g of 1,3-dichloro-4-phenyl-2-butene and 4.1 g of potassium 2,2,3,3-tetramethylcyclopropanecarboxylate and 30 ml of isopropanol is refluxed for 18 hours. The isopropanol is removed and the residue is poured into 50 ml of water. The mixture is extracted with ethyl ether and the etheral solution is washed, dried and distilled to afford 4.9 g (74 percent) of 3-chloro-4-phenyl-2buten-1-yl 2,2,3,3-tetramethylcyclopropanecarboxylate, b.p. 124°C/0.10 mmHg, $n_D^{20}=1.5252$. Analysis—Calcd. for $C_{18}H_{23}O_2Cl$: C 70.46 percent, H 7.55 percent, Found: C 70.21 percent, H 7.37 percent. The 2,2,3,3-tetramethylcyclopropanecarboxylic acid is a known compound, prepared as described in Chem. Abstr., Vol. 54, 24437(1960).

EXAMPLE 4

A solution of 4.2 g of 1-bromo-3-methyl-4-phenyl-2-butene, 3.4 g of 2,2-dimethyl-3-isobutenylcyclopropanecarboxylic acid and 3 ml of triethylamine in 50 ml of acetone is refluxed for 16 hours. The acetone is distilled off and the resulting residue is added to 50 ml of water. The mixture is extracted with ethyl ether and the etheral solution is washed, dried and then distilled to yield 4.8 g (77 percent) of 3-methyl-4-phenyl-2- -buten-1-yl 2,2-dimethyl-3-isobutenylcyclopropanecarboxylate, b.p. 142°–143°C/0.02 mmHg, $n_D^{20}$ 1.5218. Analysis—Calcd. for $C_{21}H_{28}O_2$: C 80.73 percent, H 9.03 percent, Found: C 80.54 percent, H 9.05 percent.

EXAMPLE 5

A mixture of 3.3 g of 3-chloro-4-phenyl-1-butene, 4.1 g of potassium 2,2-dimethyl-3-isobutenylcyclopropanecarboxylate and 30 ml of N,N-dimethylformamide is stirred under atmosphere of nitrogen for 12 hours at 90° to 100°C. After cooling to room temperature, the reaction mixture is poured into cold water. The mixture is extracted with petroleum ether and the extract is washed, dried and distilled to give 4.0 g of 4-phenyl-2-buten-1-yl 2,2-dimethyl-3-isobutenylcyclopropanecarboxylate, b.p. 127°–129°C/0.15 mmHg, $n_D^{20}$=1.5207. Analysis—Calcd. for $C_{20}H_{26}O_2$: C 80.49 percent, H 8.78 percent, Found: C 80.71 percent, H 8.77 percent.

EXAMPLE 6

To a sodium ethoxide solution prepared from 0.5 g sodium metal and 20 ml of ethanol is added 10 g of 4-(3-methoxyphenyl)-3-methyl-2-butene-1-ol and 3.9 g of ethyl 2,2-dimethyl-3-isobutenylcyclopropanecarboxylate. The mixture is heated for 2 hours at 100° to 120°C with removing the ethanol under atmosphere of nitrogen. After cooling, the reaction mixture is poured into water. The mixture is extracted with ethyl ether and ether solution is washed, dried and distilled to give 4.0 g (60 percent) of 4-(3-methoxyphenyl)-2-buten-1-yl 2,2-dimethyl-3-isobutenylcyclopropanecarboxylate, b.p. 151°–153°C / 0.12 mmHg, $n_D^{20}$=1.5245. Analysis—Calcd. for $C_{21}H_{28}O_3$: C 76.79 percent, H 8.59 percent, Found: C 76.58 percent, H 8.62 percent.

EXAMPLE 7

A mixture of 3.3 g of 4-(3-methylphenyl)-1-butene-3-ol, 6.4 g of 2,2-dimetyl-3-isobutenylcyclopropanecarboxylic acid anhydride and 30 ml of xylene is refluxed for 6 hours. After cooling, the reaction mixture is washed successively with aqueous sodium carbonate and water, and then dried over anhydrous magnesium sulfate. The xylene is evaporated and the resulting residue is distilled under reduced pressure to give 4.4 g (70 percent) of 4-(3-methylphenyl)-2-buten-1-yl 2,2-dimethyl-3-isobutenylcyclopropanecarboxylate, b.p. 134°–135°C/0.08 mmHg, $7_D^{20}$=1.5178. Analysis—Calcd. for $C_{21}H_{28}O_2$: C 80.73 percent, H 9.03 percent, Found: C 80.51 percent, H 8.93 percent.

The compounds listed in the following tables are also prepared similarly by any procedure exemplified in the above examples.

The followings are examples of incecticidal compositions according to the present invention and of the insecticidal activities.

EXAMPLE I 0.2 g of 3-chloro-4-phenyl-2-buten-1-yl 2,2-dimethyl-3-isobutenylcyclopropanecarboxylate is dissolved in white kerosene to form 100 ml of solution. Thus, 0.2 percent by weight oil preparation is produced.

EXAMPLE II 0.1 g of 3-chloro-4-phenyl-2-phenyl-1-yl 2,2-dimethyl-3-isobutenylcyclopropanecarboxylate, 0.1 g of allethrin and 0.2 g of octachloro-dipropyl ether are dissolved in white kerosene to form 100 ml of solution. Thus, an oil preparation is obtained.

EXAMPLE III 10 g of 3-chloro-4-phenyl-2-buten-1-yl 2,2-dimethyl-3-isobutenylcyclopropanecarboxylate, 85 g of a mixture of diatomaceous earth and kaolin and 5 g of a wetting agent are mixed and crushed. Thus, a 15 percent by weight wettable preparation is produced.

EXAMPLE IV 3 g of 3-chloro-4-phenyl-2-buten-1-yl 2,2-dimethyl-3-isobutenylcyclopropanecarboxylate and 97 g of a mixture of diatomaceous earth and kaolin are blended and crushed into a 3 percent by weight powder preparation.

EXAMPLE V 20 g of 3-chloro-4-phenyl-2-buten-1-yl 2,2-dimethyl-3-isobutenylcyclopropanecarboxylate is dissolved in a small amount of xylene. This solution is mixed with a suitable amount of emulsifier and then mixed with further xylene to produce a total volume of 100 ml. Thus, a 20 percent by weight emulsion is prepared.

EXAMPLE VI 0.2 g of 3-chloro-4-phenyl-2-buten-1-yl 2,2-dimethyl-3-isobutenylcyclopropanecarboxylate, 0.2 g of allethrin, 4.0 g of piperonyl butoxide and 6.0 g of xylene are mixed and charged in an aerosol vessel. After fixing a valve part, 85 g of a mixture of dichlorodifluoromethane, vinyl chloride and liquefied petroleum gas are added under pressure to produce a aerosol preparation.

TABLE I

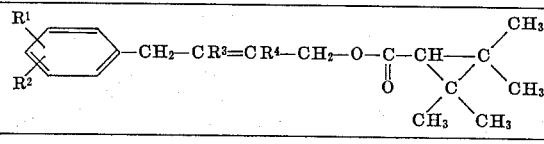

| Example number | R¹ | R² | R³ | R⁴ | Formula | Calculated C | H | Found C | H | B.p. °C./mm.Hg | $n_D^{20}$ |
|---|---|---|---|---|---|---|---|---|---|---|---|
| 8 | H | H | CH₃ | H | $C_{19}H_{25}O_2$ | 79.68 | 9.15 | 79.61 | 9.07 | 122–4/0.10 | 1.5160 |
| 9 | H | H | H | CH₃ | $C_{19}H_{25}O_2$ | 79.68 | 9.15 | 79.45 | 9.12 | 121–2/0.10 | 1.5161 |

TABLE I – Continued $$R^1R^2\text{-Phenyl}-CH_2-CR^3=CR^4-CH_2-O-C(=O)-CH(-)-C(CH_3)_2-C(CH_3)_2(-)$$

| Example number | R¹ | R² | R³ | R⁴ | Formula | Calculated C | Calculated H | Found C | Found H | B.p. °C./mm. Hg | $n_D^{20}$ |
|---|---|---|---|---|---|---|---|---|---|---|---|
| 10 | H | H | CH₃ | CH₃ | C₂₀H₂₈O₂ | 79.95 | 9.39 | 79.66 | 9.34 | 126-7/0.08 | 1.5171 |
| 11 | H | H | H | Cl | C₁₈H₂₅O₂Cl | 70.46 | 7.55 | 70.34 | 7.59 | 128-30/0.20 | 1.5265 |
| 12 | H | H | Cl | Cl | C₁₈H₂₂O₂Cl₂ | 63.35 | 6.50 | 63.29 | 6.41 | 144-6/0.13 | 1.5338 |
| 13 | H | H | Br | H | C₁₈H₂₅O₂Br | 61.54 | 6.60 | 61.59 | 6.44 | 142-3/0.23 | 1.5363 |
| 14 | 4-CH₃ | H | H | H | C₁₉H₂₆O₂ | 79.68 | 9.15 | 79.43 | 9.00 | 121/0.15 | 1.5145 |
| 15 | 4-CH₃ | H | CH₃ | H | C₂₀H₂₈O₂ | 79.95 | 9.39 | 79.92 | 9.46 | 126/0.08 | 1.5145 |
| 16 | 2-CH₃ | H | Cl | H | C₁₉H₂₅O₂Cl | 71.12 | 7.85 | 70.98 | 7.59 | 134-5/0.12 | 1.5264 |
| 17 | 3-CH₃ | H | Cl | H | C₁₉H₂₅O₂Cl | 71.12 | 7.85 | 70.84 | 7.66 | 134/0.12 | 1.5237 |
| 18 | 4-CH₃ | H | Cl | H | C₁₉H₂₅O₂Cl | 71.12 | 7.85 | 71.16 | 7.73 | 132-3/0.13 | 1.5235 |
| 19 | 4-CH₃ | H | CH₃ | CH₃ | C₂₁H₃₀O₂ | 80.21 | 9.62 | 80.18 | 9.72 | 132-4/0.10 | 1.5168 |
| 20 | 4-CH₃ | H | Cl | Cl | C₁₉H₂₄O₂Cl₂ | 64.23 | 6.81 | 64.41 | 6.57 | 147-9/0.15 | 1.5319 |
| 21 | 2-CH₃O | H | Cl | H | C₁₉H₂₅O₃Cl | 67.74 | 7.48 | 67.93 | 7.40 | 145-6/0.10 | 1.5280 |
| 22 | 4-CH₃O | H | Cl | H | C₁₉H₂₅O₃Cl | 67.74 | 7.48 | 67.66 | 7.52 | 151-3/0.15 | 1.5290 |
| 23 | 3-CH₃O | H | Cl | Cl | C₁₉H₂₄O₃Cl₂ | 61.46 | 6.56 | 61.57 | 6.41 | 156-7/0.15 | 1.5361 |
| 24 | 2-F | H | Cl | H | C₁₈H₂₂O₂ClF | 66.55 | 6.83 | 66.46 | 6.75 | 129-31/0.14 | 1.5162 |
| 25 | 2-Cl | H | H | H | C₁₈H₂₅O₂Cl | 70.46 | 7.55 | 70.32 | 7.58 | 138-9/0.32 | 1.5261 |
| 26 | 4-Cl | H | CH₃ | H | C₁₉H₂₅O₂Cl | 71.12 | 7.85 | 71.39 | 7.65 | 138-9/0.13 | 1.5240 |
| 27 | 4-Cl | H | Cl | H | C₁₈H₂₂O₂Cl₂ | 63.35 | 6.50 | 63.52 | 6.33 | 154-5/0.19 | 1.5332 |

TABLE II $$R^1R^2\text{-Phenyl}-CH_2-CR^3=CR^4-CH_2-O-C(=O)-CH(-)-CH-CH=C(CH_3)_2, \text{ with } C(CH_3)_2 \text{ ring}$$

| Example number | R¹ | R² | R³ | R⁴ | Formula | Calculated C | Calculated H | Found C | Found H | B.p. °C./mm. Hg | $n_D^{20}$ |
|---|---|---|---|---|---|---|---|---|---|---|---|
| 28 | H | H | H | CH₃ | C₂₁H₂₈O₂ | 80.73 | 9.03 | 80.80 | 9.09 | 126-7/0.06 | 1.5221 |
| 29 | H | H | CH₃ | CH₃ | C₂₂H₃₀O₂ | 80.93 | 9.26 | 80.63 | 9.34 | 144-6/0.12 | 1.5219 |
| 30 | H | H | Cl | H | C₂₀H₂₅O₂Cl | 72.14 | 7.57 | 71.95 | 7.31 | 138-40/0.20 | 1.5300 |
| 31 | H | H | H | Cl | C₂₀H₂₅O₂Cl | 72.14 | 7.57 | 72.26 | 7.51 | 164-6/0.65 | 1.5295 |
| 32 | H | H | Cl | Cl | C₂₀H₂₄O₂Cl₂ | 65.40 | 6.59 | 65.17 | 6.55 | 157-9/0.10 | 1.5404 |
| 33 | H | H | Br | H | C₂₀H₂₅O₂Br | 63.66 | 6.68 | 63.40 | 6.57 | 156-8/0.20 | 1.5406 |
| 34 | H | H | H | CH₃O | C₂₁H₂₈O₃ | 76.79 | 8.59 | 76.52 | 8.44 | 152-4/0.10 | 1.5263 |
| 35 | 2-CH₃ | H | H | H | C₂₁H₂₈O₂ | 80.73 | 9.03 | 80.84 | 9.26 | 141-4/0.10 | 1.5232 |
| 36 | 4-CH₃ | H | H | H | C₂₁H₂₈O₂ | 80.73 | 9.03 | 80.49 | 9.11 | 136-7/0.10 | 1.5207 |
| 37 | 2-Cl | H | H | H | C₂₀H₂₅O₂Cl | 72.16 | 7.57 | 71.88 | 7.52 | 141-3/0.10 | 1.5317 |
| 38 | 3-Cl | H | H | H | C₂₀H₂₅O₂Cl | 72.16 | 7.57 | 72.04 | 7.67 | 143-5/0.08 | 1.5305 |
| 39 | 4-Cl | H | H | H | C₂₀H₂₅O₂Cl | 72.16 | 7.57 | 72.93 | 7.40 | 142-4/0.10 | 1.5317 |
| 40 | 2-CH₃O | H | H | H | C₂₁H₂₈O₃ | 76.79 | 8.59 | 76.51 | 8.53 | 145-8/0.10 | 1.5263 |
| 41 | 4-CH₃O | H | H | H | C₂₁H₂₈O₃ | 76.79 | 8.59 | 76.70 | 8.46 | 156-8/0.10 | 1.5253 |
| 42 | 4-C₂H₅ | H | H | H | C₂₂H₃₀O₂ | 80.93 | 9.26 | 80.66 | 9.18 | 146-8/0.14 | 1.5208 |
| 43 | 2-CH₃ | 3-CH₃ | H | H | C₂₂H₃₀O₂ | 80.93 | 9.26 | 80.71 | 9.05 | 145-7/0.14 | 1.5258 |
| 44 | 2-CH₃ | 5-CH₃ | H | H | C₂₂H₃₀O₂ | 80.93 | 9.26 | 80.82 | 9.14 | 142-5/0.10 | 1.5233 |
| 45 | 2-CH₃ | 6-CH₃ | H | H | C₂₂H₃₀O₂ | 80.93 | 9.26 | 80.73 | 9.27 | 144-5/0.11 | 1.5249 |
| 46 | 2-CH₃ | H | CH₃ | H | C₂₂H₃₀O₂ | 80.93 | 9.26 | 80.78 | 9.12 | 135-8/0.07 | 1.5242 |
| 47 | 3-CH₃ | H | CH₃ | H | C₂₂H₃₀O₂ | 80.93 | 9.26 | 81.16 | 9.08 | 134-7/0.08 | 1.5211 |
| 48 | 4-CH₃ | H | CH₃ | H | C₂₂H₃₀O₂ | 80.93 | 9.26 | 80.94 | 9.17 | 141-6/0.10 | 1.5207 |
| 49 | 2-Cl | H | CH₃ | H | C₂₁H₂₇O₂Cl | 72.71 | 7.85 | 72.56 | 7.77 | 145-7/0.07 | 1.5303 |
| 50 | 3-Cl | H | CH₃ | H | C₂₁H₂₇O₂Cl | 72.71 | 7.85 | 72.81 | 7.70 | 154-7/0.15 | 1.5302 |
| 51 | 4-Cl | H | CH₃ | H | C₂₁H₂₇O₂Cl | 72.71 | 7.85 | 72.63 | 7.89 | 155-6/0.15 | 1.5301 |
| 52 | 2-CH₃O | H | CH₃ | H | C₂₂H₃₀O₃ | 77.15 | 8.83 | 77.02 | 8.99 | 157-60/0.10 | 1.5266 |
| 53 | 3-CH₃O | H | CH₃ | H | C₂₂H₃₀O₃ | 77.15 | 8.83 | 76.86 | 8.90 | 155-8/0.13 | 1.5265 |
| 54 | 4-CH₃O | H | CH₃ | H | C₂₂H₃₀O₃ | 77.15 | 8.83 | 76.94 | 8.73 | 155-6/0.10 | 1.5260 |
| 55 | 2-CH₃ | 4-CH₃ | CH₃ | H | C₂₃H₃₂O₂ | 81.13 | 9.47 | 80.97 | 9.38 | 165-9/0.20 | 1.5228 |
| 56 | 2-CH₃O | 5-CH₃ | CH₃ | H | C₂₃H₃₂O₃ | 77.49 | 9.05 | 77.35 | 9.14 | 155-7/0.05 | 1.5257 |
| 57 | 2-Cl | 4-Cl | CH₃ | H | C₂₁H₂₆O₂Cl₂ | 66.14 | 6.87 | 66.31 | 6.80 | 157-9/0.04 | 1.5381 |
| 58 | 2-CH₃ | H | H | CH₃ | C₂₂H₃₀O₂ | 80.93 | 9.26 | 80.79 | 9.06 | 145-8/0.16 | 1.5254 |
| 59 | 3-CH₃ | H | H | CH₃ | C₂₂H₃₀O₂ | 80.93 | 9.26 | 80.82 | 9.17 | 137-9/0.12 | 1.5221 |
| 60 | 4-CH₃ | H | H | CH₃ | C₂₂H₃₀O₂ | 80.93 | 9.26 | 81.00 | 9.13 | 139-41/0.12 | 1.5223 |
| 61 | 2-Cl | H | H | CH₃ | C₂₁H₂₇O₂Cl | 72.71 | 7.85 | 72.75 | 7.59 | 155-7/0.15 | 1.5310 |
| 62 | 3-Cl | H | H | CH₃ | C₂₁H₂₇O₂Cl | 72.71 | 7.85 | 72.63 | 7.84 | 146-7/0.08 | 1.5304 |
| 63 | 4-Cl | H | H | CH₃ | C₂₁H₂₇O₂Cl | 72.71 | 7.85 | 72.87 | 7.88 | 149-52/0.12 | 1.5306 |
| 64 | 2-CH₃O | H | H | CH₃ | C₂₂H₃₀O₃ | 77.15 | 8.83 | 77.22 | 8.61 | 159-62/0.11 | 1.5268 |
| 65 | 3-CH₃O | H | H | CH₃ | C₂₂H₃₀O₃ | 77.15 | 8.83 | 77.16 | 8.84 | 155-6/0.10 | 1.5259 |
| 66 | 4-CH₃O | H | H | CH₃ | C₂₂H₃₀O₃ | 77.15 | 8.83 | 76.97 | 8.78 | 157-9/0.10 | 1.5257 |
| 67 | 4-CH₃ | H | CH₃ | CH₃ | C₂₃H₃₂O₂ | 81.13 | 9.47 | 80.98 | 9.47 | 148-51/0.15 | 1.5245 |
| 68 | 4-Cl | H | CH₃ | CH₃ | C₂₂H₂₉O₂Cl | 73.21 | 8.10 | 73.48 | 8.02 | 150-2/0.10 | 1.5313 |
| 69 | 4-CH₃O | H | CH₃ | CH₃ | C₂₃H₃₂O₃ | 77.49 | 9.05 | 77.31 | 8.95 | 159-62/0.15 | 1.5277 |
| 70 | 2-CH₃ | H | Cl | H | C₂₁H₂₇O₂Cl | 72.71 | 7.85 | 72.84 | 7.88 | 155-7/0.07 | 1.5336 |
| 71 | 3-CH₃ | H | Cl | H | C₂₁H₂₇O₂Cl | 72.71 | 7.85 | 72.48 | 7.86 | 150-1/0.08 | 1.5308 |
| 72 | 4-CH₃ | H | Cl | H | C₂₁H₂₇O₂Cl | 72.71 | 7.85 | 72.65 | 7.69 | 150-1/0.15 | 1.5291 |
| 73 | 2-F | H | Cl | H | C₂₀H₂₄O₂ClF | 68.46 | 6.89 | 68.63 | 6.84 | 152-4/0.20 | 1.5223 |
| 74 | 3-F | H | Cl | H | C₂₀H₂₂O₂ClF | 68.46 | 6.89 | 68.57 | 6.72 | 160-2/0.35 | 1.5197 |
| 75 | 4-F | H | Cl | H | C₂₀H₂₄O₂ClF | 68.46 | 6.89 | 68.42 | 6.83 | 154/0.28 | 1.5181 |
| 76 | 2-Cl | H | Cl | H | C₂₀H₂₄O₂Cl₂ | 65.40 | 6.59 | 65.33 | 6.42 | 155-6/0.08 | 1.5405 |
| 77 | 3-Cl | H | Cl | H | C₂₀H₂₄O₂Cl₂ | 65.40 | 6.59 | 65.27 | 6.51 | 167-8/0.16 | 1.5372 |
| 78 | 4-Cl | H | Cl | H | C₂₀H₂₄O₂Cl₂ | 65.40 | 6.59 | 65.46 | 6.55 | 165-6/0.15 | 1.5376 |
| 79 | 2-CH₃O | H | Cl | H | C₂₁H₂₇O₃Cl | 69. | 7.50 | 69.37 | 7.49 | 157-8/0.07 | 1.5338 |
| 80 | 3-CH₃O | H | Cl | H | C₂₁H₂₇O₃Cl | 69.50 | 7.50 | 69.56 | 7.45 | 162-5/0.06 | 1.5345 |
| 81 | 4-CH₃O | H | Cl | H | C₂₁H₂₇O₃Cl | 69.50 | 7.50 | 69.41 | 7.58 | 167-9/0.20 | 1.5348 |
| 82 | 4-C₂H₅ | H | Cl | H | C₂₂H₂₉O₂Cl | 73.21 | 8.10 | 73.19 | 8.03 | 158-62/0.08 | 1.5276 |
| 83 | 2-CH₃ | 4-CH₃ | Cl | H | C₂₂H₂₉O₂Cl | 73.21 | 8.10 | 73.37 | 8.05 | 157-9/0.10 | 1.5308 |
| 84 | 4-CH₃ | 2-CH₃O | Cl | H | C₂₂H₂₉O₃Cl | 70.10 | 7.76 | 69.89 | 7.66 | 165-6/0.06 | 1.5322 |
| 85 | 4-CH₃ | H | H | Cl | C₂₁H₂₇O₂Cl | 72.71 | 7.85 | 72.62 | 7.84 | 149-51/0.13 | 1.5283 |
| 86 | 2-CH₃ | H | Cl | Cl | C₂₁H₂₆O₂Cl₂ | 66.14 | 6.87 | 66.34 | 6.86 | 175-6/0.20 | 1.5390 |

TABLE II—Continued

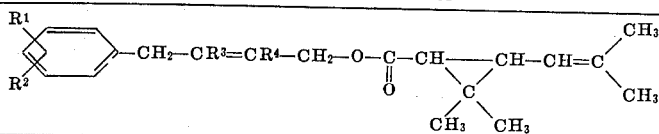

| Example number | R¹ | R² | R³ | R⁴ | Formula | Percent Calculated C | H | Percent Found C | H | B.p. °C./ mm. Hg | $n_D^{20}$ |
|---|---|---|---|---|---|---|---|---|---|---|---|
| 87 | 3-CH₃ | H | Cl | Cl | $C_{21}H_{26}O_2Cl_2$ | 66.14 | 6.87 | 66.01 | 6.64 | 165–7/0.10 | 1.5352 |
| 88 | 4-CH₃ | H | Cl | Cl | $C_{21}H_{26}O_2Cl_2$ | 66.14 | 6.87 | 66.23 | 6.79 | 164–5/0.10 | 1.5360 |
| 89 | 4-F | H | Cl | Cl | $C_{20}H_{23}O_2Cl_2F$ | 62.34 | 6.02 | 62.16 | 5.98 | 155–6/0.15 | 1.5269 |
| 90 | 2-Cl | H | Cl | Cl | $C_{20}H_{23}O_2Cl_3$ | 59.79 | 5.77 | 59.74 | 5.72 | 175–7/0.13 | 1.5449 |
| 91 | 3-Cl | H | Cl | Cl | $C_{20}H_{23}O_2Cl_3$ | 59.79 | 5.77 | 59.90 | 5.85 | 177–80/0.13 | 1.5452 |
| 92 | 4-Cl | H | Cl | Cl | $C_{20}H_{23}O_2Cl_3$ | 59.79 | 5.77 | 59.66 | 5.67 | 182–3/0.15 | 1.5435 |
| 93 | 2-CH₃O | H | Cl | Cl | $C_{21}H_{26}O_3Cl_2$ | 63.48 | 6.60 | 63.40 | 6.59 | 175–6/0.13 | 1.5412 |
| 94 | 3-CH₃O | H | Cl | Cl | $C_{21}H_{26}O_3Cl_2$ | 63.48 | 6.60 | 63.32 | 6.63 | 175–8/0.13 | 1.5391 |
| 95 | 4-CH₃O | H | Cl | Cl | $C_{21}H_{26}O_3Cl_2$ | 63.48 | 6.60 | 63.51 | 6.54 | 177–8/0.10 | 1.5396 |
| 96 | 4-CH₃ | H | H | CH₃O | $C_{22}H_{30}O_3$ | 77.15 | 8.83 | 77.04 | 8.77 | 152–5/0.10 | 1.5240 |

TABLE III

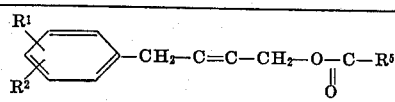

| Example number | R¹ | R² | R⁵ | Formula | Percent Calculated C | H | Percent Found C | H | B.p. °C./ mm. Hg | $n_D^{20}$ |
|---|---|---|---|---|---|---|---|---|---|---|
| 97 | H | H | —CH—C(CH₃)₂ / C(CH₃)₂ with CH₃ | $C_{18}H_{22}O_2$ | 79.96 | 8.20 | 79.66 | 8.13 | 126–7/0.14 | 1.5246 |
| 98 | 4-CH₃ | H | —CH—C(CH₃)₂ / C(CH₃)₂ with CH₃ | $C_{19}H_{24}O_2$ | 80.24 | 8.51 | 80.11 | 8.29 | 129–31/0.10 | 1.5233 |
| 99 | 4-CH₃ | H | —CH—CH—CH=C(CH₃)₂ / C(CH₃)₂ with CH₃ | $C_{21}H_{26}O_2$ | 81.25 | 8.44 | 81.12 | 8.59 | 146–9/0.15 | 1.5314 |

EXAMPLE VII

A solution of 1.5 g of 3-chloro-4-phenyl-2-buten-1-yl 2,2-dimethyl-3isobutenylcyclopropanecarboxylate in 30 ml of acetone is stirred and mixed with 98.5 g of a mosquito coil carrier. After evaporating the acetone, the mixture is added with 100 ml of water and then kneaded. The kneaded mixture is moulded and dried. Thus, a composition of the present invention is produced in the form of mosquito coil.

EXAMPLE VIII

Insecticidal powers of the present compounds are tested by topical application method on the pronotum of houseflies (adult) with the prepared each acetone solutions. 50 percent lethal doses after 24 hours are shown in the following table IV.

TABLE IV

| Compounds (Example No.) | LD₅₀ (γ/housefly) | Compounds (Example No.) | LD₅₀ (γ/housefly) |
|---|---|---|---|
| 1 | 4.00 | 39 | 0.95 |
| 2 | 0.49 | 48 | 1.60 |
| 3 | 0.21 | 70 | 0.43 |
| 4 | 0.47 | 71 | 0.44 |
| 5 | 0.20 | 72 | 0.18 |
| 7 | 1.85 | 73 | 0.21 |
| 8 | 2.33 | 74 | 0.29 |
| 9 | 2.00 | 75 | 0.36 |
| 10 | 1.00 | 76 | 1.00 |
| 12 | 0.62 | 77 | 1.19 |
| 28 | 0.97 | 78 | 0.42 |
| 29 | 0.86 | 80 | 1.46 |
| 30 | 0.097 | 81 | 0.33 |
| 32 | 0.16 | 82 | 0.99 |
| 34 | 0.41 | 97 | 0.56 |
| 35 | 1.55 | Allethrin | 0.59 |
| 36 | 0.36 | Phthalthrin* | 1.02 |

* tetrahydrophthalimidemethyl chrysanthemate

EXAMPLE IX

Similarly as in example I, oil preparations containing the present compound in a given concentration were prepared. By use of Nagasawa's mist settling apparatus (Bochu Kagaku 18(4), 183–192), 0.5 ml of each oil preparation was atomized under 20 lb/in.² After 10 seconds, a shutter was opened and a group of 20 houseflies (adult) was exposed to settling mist. The number of knocked down houseflies was observed relative to the lapse of time. 30 minutes after, houseflies were transferred to an observation cage, kept at a temperature of 25°–27°C for 24 hours and number of the killed was observed. The result is shown in table V.

TABLE V

| Oil Preparation Compound (Ex. No.) | Conc. (%) | Remarks | Knockdown ratio relative to lapse of time (%) 3 min | 5 min | 10 min | 15 min | 30 min | Mortality ratio (%) | $KT_{50}$ |
|---|---|---|---|---|---|---|---|---|---|
| 1 | 0.5 | | 14 | | 49 | | | | |
| 2 | 0.5 | | | 39 | 77 | 90 | | | 6.3 |
| 2 | 0.5 | a | | 60 | 85 | 98 | | | 4.6 |
| 3 | 0.5 | | | 46 | 62 | 89 | | | 6.0 |
| 3 | 0.5 | a | | 66 | 93 | 100 | | | 3.0 |
| 4 | 0.4 | | | | | | | 40 | |
| 5 | 0.2 | | | | | | | 70 | |
| 8 | 0.5 | | 14 | | 48 | | | | |
| 9 | 0.5 | | 7 | | 66 | | | | |
| 10 | 0.5 | | 7 | | 60 | | | | |
| 11 | 1.0 | | 7 | | 67 | 96 | | 100 | |
| 11 | 0.16 | b | 46 | | 68 | 100 | | | 4.5 |
| 12 | 1.0 | | 19 | | 74 | | | | 6.6 |
| 12 | 0.3 | c | 38 | | | | | | 4.5 |
| 13 | 0.5 | | 41 | | 81 | | | 100 | |
| 28 | 0.4 | | | | | | 30 | | |
| 29 | 0.4 | | | | | | 30 | | |
| 31 | 0.5 | | 4 | | 56 | 93 | | 100 | |
| 31 | 0.16 | b | 48 | | 65 | 95 | | 100 | |
| 32 | 0.16 | d | 40 | | 59 | | | | |
| 33 | 0.5 | | 0 | | 53 | 94 | | 100 | |
| 33 | 0.16 | b | 20 | | 74 | 92 | | 100 | |
| 34 | 1.0 | | | | 45 | 74 | 96 | 100 | |
| 34 | 0.5 | | | | 12 | 63 | 95 | 100 | |
| 34 | 0.1 | | | | 0 | 8 | 67 | 78 | |
| 34 | 0.1 | e | | | 38 | 63 | | 100 | |
| 97 | 0.5 | f | 5 | | 22 | | | 100 | |
| 97 | 0.5 | b | 27 | | 96 | | | 100 | |
| 97 | 0.16 | | 38 | | 91 | 100 | | 100 | | a: 5% by weight of piperonyl butoxide is added
b: 0.04% pyrethrin and 1.0% piperonyl butoxide
c: 1.5% octachlorodipropylether
d: 0.04% Phthalthrin
e: 1.0% piperonyl butoxide
f: 5% octachlorodipropylether

EXAMPLE X

Similarly as in example I, oil preparations containing 0.2 percent of the present compound were prepared, and 50 percent knockdown time ($KT_{50}$) were determined by means of Nagasawa's mist settling method (example IX). The result is shown in table VI.

TABLE VI

| Compounds (Example No.) | $KT_{50}$ |
|---|---|
| 16 | 7.0 |
| 17 | 6.8 |
| 22 | 6.6 |
| 24 | 3.7 |
| 35 | 8.7 |
| 39 | 5.9 |
| 71 | 4.4 |
| 76 | 3.5 |
| 77 | 2.5 |
| 78 | 6.3 |
| 80 | 2.7 |

What we claim is:

1. A cyclopropanecarboxylic acid ester represented by the general formula

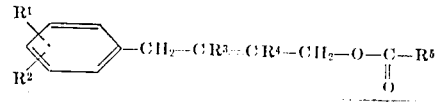

wherein $R^1$ and $R^2$ are independently hydrogen or a halogen atom or a lower alkyl group or methoxy or nitro; $R^3$ and $R^4$ are independently hydrogen or a halogen atom or methyl or methoxy and $R^5$ is one selected from the group consisting of the following radicals:

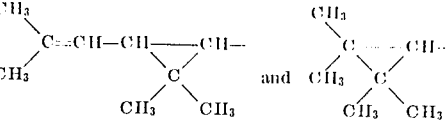

2. A compound according to claim 1 wherein $R^1$, $R^2$ and $R^4$ are each hydrogen, $R^3$ is chloro and $R^5$ is the 2,2-dimethyl-3-isobutenylcyclopropane radical.

3. A compound according to claim 1 wherein $R^1$, $R^2$ and $R^4$ are each hydrogen, $R^3$ is chloro and $R^5$ is the 2,2,3,3-tetramethylcyclopropane radical.

4. A compound according to claim 1 wherein $R^1$, $R^2$, $R^3$ and $R^4$ are each hydrogen and $R^5$ is the 2,2-dimethyl-3-isobutenycyclopropane radical.

5. A compound according to claim 1 wherein $R^1$, $R^2$ and $R^3$ are each hydrogen, $R^4$ is chloro and $R^5$ is the 2,2-dimethyl-3-isobutenylcyclopropane radical.

6. A compound according to claim 1 wherein $R^1$ and $R^2$ are each hydrogen, $R^3$ and $R^4$ are each chloro and $R^5$ is the 2,2-dimethyl-3-isobutenylcyclopropane radical.

7. A compound according to claim 1 wherein $R^1$, $R^2$ and $R^4$ are each hydrogen, $R^3$ is bromo and $R^5$ is the 2,2-dimethyl-3-isobutenylcyclopropane radical.

8. A compound according to claim 1 wherein $R^1$, $R^2$ and $R^3$ are each hydrogen, $R^4$ is methoxy and $R^5$ is the 2,2-dimethyl-3-isobutenylcyclopropane radical.

9. A compound according to claim 1 wherein $R^1$ is methyl, $R^2$, $R^3$ and $R^4$ are each hydrogen and $R^5$ is the 2,2-dimethyl-3-iosbutenylcyclopropane radical.

10. A compound according to claim 1 wherein $R^1$ is methyl, $R^3$ is chloro, $R^2$ and $R^4$ are each hydrogen and $R^5$ is the 2,2-dimethyl-3-isobutenylcyclopropane radical.

11. A compound according to claim 1 wherein $R^1$ is fluoro, $R^3$ is chloro, $R^2$ and $R^4$ are each hydrogen and $R^5$ is the 2,2-dimethyl-3-isobutenylcyclopropane radical.

12. A compound according to claim 1 wherein $R^1$ and $R^3$ are each chloro, $R^2$ and $R^4$ are each hydrogen and $R^5$ is the 2,2-dimethyl-3-isobutenylcyclopropane radical.

13. A compound according to claim 1 wherein $R^1$ is methoxy, $R^2$ and $R^4$ are each hydrogen, $R^3$ is chloro and $R^5$ is the 2,2-dimethyl-3-isobutenylcyclopropane radical.

* * * * *